US010067875B2

(12) United States Patent
Bean

(10) Patent No.: US 10,067,875 B2
(45) Date of Patent: Sep. 4, 2018

(54) PROCESSOR WITH INSTRUCTION CACHE THAT PERFORMS ZERO CLOCK RETIRES

(71) Applicant: VIA ALLIANCE SEMICONDUCTOR CO., LTD., Shanghai (CN)

(72) Inventor: Brent Bean, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 21 days.

(21) Appl. No.: 15/364,487

(22) Filed: Nov. 30, 2016

(65) Prior Publication Data

US 2018/0137056 A1  May 17, 2018

Related U.S. Application Data

(63) Continuation of application No. 15/350,356, filed on Nov. 14, 2016.

(51) Int. Cl.
G06F 12/00    (2006.01)
G06F 12/0875  (2016.01)
G06F 12/0862  (2016.01)
G06F 12/0888  (2016.01)

(52) U.S. Cl.
CPC ...... *G06F 12/0875* (2013.01); *G06F 12/0862* (2013.01); *G06F 12/0888* (2013.01); *G06F 2212/452* (2013.01); *G06F 2212/6022* (2013.01); *G06F 2212/6046* (2013.01)

(58) Field of Classification Search
None
See application file for complete search history.

(56) References Cited

U.S. PATENT DOCUMENTS

| 6,397,296 B1 | 5/2002 | Werner |
| 9,354,885 B1 | 5/2016 | Gschwind et al. |
| 2007/0067577 A1 | 3/2007 | Henry et al. |
| 2016/0189761 A1 | 6/2016 | Noguchi et al. |

FOREIGN PATENT DOCUMENTS

WO    WO2013101031 A1    7/2013

OTHER PUBLICATIONS

European Search Report dated Jun. 30, 2017, issued in application No. 16207545.1-1953.

*Primary Examiner* — Midys Rojas
(74) *Attorney, Agent, or Firm* — McClure, Qualey & Rodack, LLP

(57) ABSTRACT

A method of operating a processor including performing successive read cycles from an instruction cache array and a line buffer array including providing sequential memory addresses, detecting a read hit in the line buffer array, and performing a zero clock retire while performing successive read cycles. The zero clock retire includes switching the instruction cache array from a read cycle to a write cycle for one cycle, selecting a line buffer and providing a cache line stored in the selected line buffer to be stored into the instruction cache array at an address stored in the selected line buffer, and bypassing a sequential memory address being provided to the instruction cache array during the zero clock retire. If the bypassed address missed the line buffer array, the bypassed address may be replayed with a slight time penalty, which is outweighed by the time savings of zero clock retires.

20 Claims, 4 Drawing Sheets

PROCESSOR WITH INSTRUCTION CACHE THAT PERFORMS ZERO CLOCK RETIRES

CROSS REFERENCE TO RELATED APPLICATION(S)

This application is a continuation of the following U.S. Patent Application which is hereby incorporated by reference in its entirety for all intents and purposes.

| SER. NO. | FILING DATE | TITLE |
|---|---|---|
| 15/350,356 | Nov. 14, 2016 | PROCESSOR WITH INSTRUCTION CACHE THAT PERFORMS ZERO CLOCK RETIRES |

BACKGROUND OF THE INVENTION

Field of the Invention

The present invention relates in general to a processor performance, and more particularly to an instruction cache (icache) that performs zero clock retires in which cache lines stored in response buffers are written into an icache array without inserting timing delays.

Description of the Related Art

In order to improve performance and efficiency, processors typically incorporate one or more levels of cache memory that locally stores information retrieved from external memory for faster access by processing circuitry. The term "processor" as used herein refers to any type of processing unit, including a microprocessor, a central processing unit (CPU), one or more processing cores, a microcontroller, etc. The term "processor" as used herein also includes any type of processor configuration, such as processing units integrated on a chip or integrated circuit (IC) including those incorporated within a system of a chip (SOC) or the like. When the processor requests information from an external system memory that is located in an internal cache invoking a cache hit, the information is retrieved with reduced latency. Otherwise, a cache miss occurs and the information is retrieved from higher cache levels and/or the system memory with greater latency as compared to internal cache memory. As processing continues and as the internal processor caches are filled, an increased percentage of cache hits occurs thereby improving overall processor performance.

A processor may include different types of caches, including an instruction cache (icache), a data cache (dcache), a unified cache (storing both data and instructions), a translation look-aside buffer (TLB), etc. The icache is used to store cache lines retrieved from the system memory containing instructions for execution by the processor. The icache is a smaller and faster level-1 (L1) cache to achieve desired speed and performance. The icache may be implemented using a custom static random-access memory (SRAM) array. Since the physical size of a cache array grows substantially when additional ports are implemented, the icache is often implemented with only one read/write (R/W) port to reduce the physical size of the icache. A physically smaller cache array also reduces power consumption and facilitates the ability to meet timing parameters.

In a cache system where the cache arrays are single-ported, such as the icache, only one read or write can occur in a given cycle. In a system where cache reads are performance critical, such as the icache, interrupting a stream of reads in order to do a write is not desirable. The icache typically includes a relatively small number of line fill buffers, referred to herein as response buffers. When a miss occurs in the icache, a response buffer is allocated and the cache line is retrieved from the system memory or a higher cache level, such as a level-2 (L2) unified cache or the like, and the retrieved cache line is stored into the allocated response buffer. Valid information in the response buffers must ultimately be "retired" in which it is moved to the icache data array for future access. In a conventional, single-ported icache configuration, each response buffer had to interrupt sequential address read operations within the icache in order to write information into the icache array. Each retire interruption inserted a timing delay into the fetch stream of the icache thereby significantly reducing performance over time.

SUMMARY OF THE INVENTION

A method of operating a processor according to one embodiment includes performing successive read cycles from an instruction cache array and a line buffer array including providing sequential memory addresses, detecting a read hit in the line buffer array, and performing a zero clock retire while performing successive read cycles. Performing a zero clock retire includes switching the instruction cache array from a read cycle to a write cycle for one cycle, selecting a line buffer of the line buffer array and providing a cache line stored in the selected line buffer to be stored into the instruction cache array at an address stored in the selected line buffer, and bypassing a sequential memory address being provided to the instruction cache array during the zero clock retire.

The zero clock retire may further include selecting an address index from the selected line buffer to be provided to an index input of the instruction cache array, selecting a way value from the selected line buffer to be provided to a way input of the instruction cache array, and selecting a tag address and a cache line from the selected line buffer to be provided to respective inputs of the instruction cache array. The method may include selecting a line buffer that is being read during the zero clock retire, or selecting a line buffer that is not being read during the zero clock retire. The method may include controlling select logic that selects between an address index of a selected line buffer and an address index of the sequential addresses.

The method may include detecting the bypassed sequential memory address hitting the line buffer array during a subsequent cycle, and continuing performing successive read cycles. The method may include performing successive read cycles to data subchunks of sequential cache lines, detecting an address to a first data subchunk of a first cache line hitting the line buffer array, performing the zero clock retire during the next cycle after detecting a read hit, and bypassing an address to a last data subchunk of the first cache line. The method may further include subsequently detecting the address to the last data subchunk of the first cache line hitting the line buffer array, reading the last data subchunk from the line buffer array, detecting an address to a first data subchunk of a second and sequential cache line hitting the line buffer array while reading the last data subchunk, and performing another zero clock retire in a next cycle after detecting the address to the first data subchunk of a second cache line hitting the line buffer array. The method may include selecting a line buffer storing the first cache line, and selecting a line buffer storing the second and sequential cache line.

The method may include detecting the bypassed sequential memory address missing the line buffer array during a subsequent cycle, terminating performing successive read cycles, and providing the bypassed sequential memory address again during a subsequent read cycle from the instruction cache array and the line buffer array.

A processor according to one embodiment includes a branch unit that provides a branch address, an address generator that receives the branch address and that provides sequential addresses, a line buffer system receiving the sequential addresses, an instruction cache array, select logic, and a control unit. The line buffer system may include multiple line buffers and a search unit that searches the line buffers for at least one of the sequential addresses and that provides a hit indication indicative of whether a match is found. The control unit performs a zero clock retire in response to a hit indication, in which it controls the instruction cache array to switch to a write cycle, controls the select logic to provide an address and a cache line from a selected line buffer to write the cache line into the instruction cache array at a location based on the address, and controls the select logic to bypass one of the sequential addresses.

The address from the selected line buffer may be a tag provided to a tag input of the instruction cache array and an index provided to the select logic for selecting from among multiple sets within the instruction cache array for storing the cache line. The selected line buffer may further store a way value that is provided to a way input of the instruction cache array for selecting from among multiple ways of a selected set.

The control unit may control the select logic to select the line buffer that stores a matching address that caused the hit indication, or may control the select logic to select another line buffer. The control unit may initiate a read cycle from a matching line buffer after performing the zero clock retire when the search unit subsequently provides the hit indication indicating that a matching line buffer stores an address that matches the sequential addresses that was bypassed. The control unit may perform the zero clock retire each time that the hit indication is a first hit of one of the line buffers. After performing the zero clock retire, the control unit may control the address generator to replay the sequential address that was bypassed if it subsequently misses the line buffers.

The address generator may include an adder that increments each subsequent address by less than a full cache line to address each of multiple data subchunks within each cache line. The processor may further include a prefetcher that prefetches a cache line at an address that misses both the instruction cache and the line buffer system.

BRIEF DESCRIPTION OF THE DRAWINGS

The benefits, features, and advantages of the present invention will become better understood with regard to the following description, and accompanying drawings where.

DETAILED DESCRIPTION

The inventor has recognized performance issues associated with a single-ported icache. He has therefore developed a zero clock retire system and method that reduces timing delays that were conventionally inserted into the fetch stream to retire cache lines into the icache array. The icache may be implemented in a pipeline structure. Most of the time, sequential cache lines are read from the icache in which a fetch address at the top of the icache pipeline is incremented by a predetermined amount during successive clock cycles. The fetch address stream may occasionally be interrupted by branches or snoops or the like. In the event of a branch, assuming the branch location has not yet been loaded into the icache array, the icache requests the cache line at the branch address and the pipeline is temporarily stalled. A prefetch unit prefetches (or prompts to request) the next several sequential cache lines into the response buffers, and when the first cache line is returned, the icache begins processing out of the response buffer array.

While reading cache information from a response buffer at the bottom of the icache pipeline, sequential addresses are provided at the top of the icache pipeline. The sequential addresses are generated by incrementing each address in each successive clock cycle. Since the fetch address at the top of the array will likely hit the response buffer array, the address may be bypassed in order to perform a write cycle to write a cache line from a response buffer to the icache array. The fetch address bypasses the icache array, but is still provided for comparison in the response buffer array. If the bypassed fetch address subsequently hits a response buffer, then the bypass is inconsequential, the write cycle delay is avoided and sequential read processing may continue without delay. If, however, the bypassed address does not hit a response buffer, then the address is fed back and replayed causing a replay time penalty. Over multiple processing cycles, the replay time penalty is significantly smaller than the cumulative write cycle delays, resulting in an increase of efficiency and performance of the icache.

Figure 1:
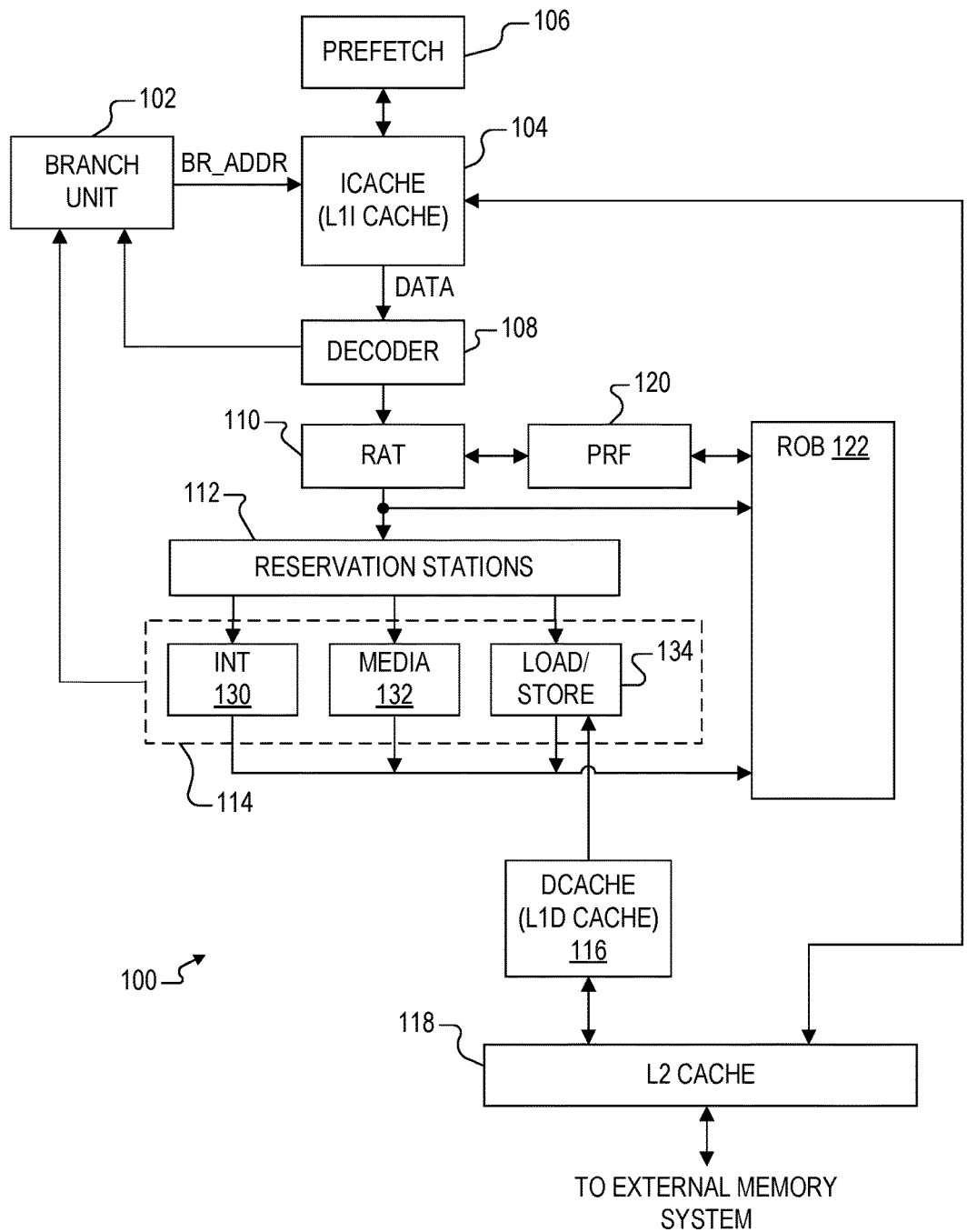
FIG. 1 is a simplified block diagram of a processor incorporating an instruction cache implemented according to one embodiment of the present invention.

FIG. 1 is a simplified block diagram of a processor 100 incorporating an instruction cache (icache) 104 implemented according to one embodiment of the present invention. The standard instruction set architecture (ISA) of the processor 100 may be an x86 macroarchitecture in which it can correctly execute a majority of the application programs that are designed to be executed on an x86 processor. An application program is correctly executed if its expected results are obtained. In particular, the processor 100 executes instructions of the x86 instruction set and includes the x86 user-visible register set. The present invention is not limited to x86 architectures, however, in which the processor 100 may be according to any alternative ISA as known by those of ordinary skill in the art. The processor 100 includes a branch unit 102, the icache 104, a prefetch unit 106, a decoder 108, a register alias table (RAT) 110, reservation stations 112, execution units 114, a data cache (dcache) 116, a level-2 (L2) cache 118, a physical register file (PRF) 120 and a reorder buffer (ROB) 122.

In the illustrated configuration, the icache 104 and the dcache 116 are both level-1 (L1) caches. The icache 104 is an L1 instruction (L1I) cache for storing program instructions or code retrieved from the system memory, and the dcache 116 is an L1 data cache (L1D) for handling data retrieved from or sent to the system memory. The second level L2 cache 118 may be a "unified" cache in that it incorporates both data and code information to and from the L1 caches 104 and 116. The L2 cache 118 communicates with external devices, such as bus interfaces and/or additional cache levels and the like for ultimately accessing data and instructions (or code) from the external system memory. The prefetch unit 106 detects a cache line request submitted from the icache 104 to the L2 cache 116, and responsively increments the address to generate (or cause the icache 104 to generate) one or more additional sequential cache line requests to fill the icache 104 with sequential cache lines.

The execution units 114 may include one or more integer (INT) units 130, one or more floating point or media units 132, one or more load and store pipelines (load/store pipes) 134, and any other type of execution units (not shown). The load/store pipes 134 may be configured as separate load and store pipelines and/or load and store combination pipes, and may further incorporate a memory order buffer (MOB) (not shown) or the like. The reservation stations 112 may include any combination of schedulers for dispatching instructions to the individual execution units 114. For example, separate integer, media and load/store schedulers may be included for dispatching instructions to the INT units 130, the media units 132 and the load/store pipes 134, respectively.

The branch unit 102 monitors processing operation via the decoder 108 and the executions units 114 to predict branch results and to provide one or more branch addresses to the icache 104, which is shown in simplified form as a branch address BR_ADDR. The icache 104 jumps to the branch location indicated by the branch address and begins to retrieve sequential cache lines from external system memory via the L2 cache 118. The icache 104 sequentially advances through inline code until an instruction or other event interrupts the fetch stream, such as new branch address or the like. In the event of a branch, the branch unit 102 communicates to the icache 104 to redirect to the provided branch address BR_ADDR. The icache 104 provides cache line information, shown generally as DATA, to the decoder 108, which parses the cache lines into macroinstructions and operands and then to corresponding microinstructions and operands suitable for execution by the execution units 114. In one embodiment, instruction translation is a process that translates the macroinstructions (or macro-ops) of a macroinstruction set of the processor 100 (such as the x86 instruction set architecture) into microinstructions (or micro-ops) of a microinstruction set architecture of the processor 100.

The microinstructions are provided to the RAT 110, which generates dependency information for each instruction based on its program order, on the operand sources it specifies, and on renaming information. The RAT 110 dispatches the decoded micro-ops and their associated dependency information to the reservation stations 112, which includes at least one queue that holds the instructions and dependency information received from the RAT 110. The reservation stations 112 dispatch received instructions to corresponding ones of the execution units 114 when they are ready to be executed. An instruction is considered ready for execution when all of its dependencies are resolved. In conjunction with dispatching an instruction, the RAT 110 allocates an entry in the ROB 122 for the instruction. Thus, the instructions are allocated in program order into the ROB 122, which may be configured as a circular queue to ensure that the instructions are retired in program order. The RAT 110 also provides the dependency information to the ROB 122 for storage in the instruction's entry therein. The RAT 110 further allocates or maps one or more physical registers within the PRF 120 for each instruction for storage of operands and results.

The results of the execution units 114 may be fed back to the ROB 122 to update corresponding registers within the PRF 120. In one embodiment, the RAT 110 maps architectural registers to physical registers in the PRF 120 and updates pointers or the like (not shown) in the ROB 122 corresponding to the instructions. The pointers in the ROB 122 may be updated during or after execution, and the pointers are used to update contents of registers within the PRF 120 during operation. The ROB 122 ultimately retires instructions in program order to ensure proper operation in accordance with the instructions of the operative process or application being executed.

The processor 100 may be superscalar and may be capable of issuing multiple instructions to the execution units 112 in a single clock cycle. The processor 100 may also be configured to perform out-of-order execution. That is, the reservation stations 112 may issue instructions out of the order specified by the program that includes the instructions. Superscalar out-of-order execution processors typically attempt to maintain a relatively large pool of outstanding instructions so that they can take advantage of a larger amount of instruction parallelism. The processor 100 may also perform speculative execution of instructions in which it executes instructions, or at least performs some of the actions prescribed by the instruction, before it is known for certain whether the instruction will actually complete. An instruction may not complete for a variety of reasons, such as a mispredicted (i.e., wrongly predicted) branch instruction, exceptions (interrupts, page faults, divide by zero conditions, general protection errors, etc.), and so forth. Although the processor 100 may perform some of the actions prescribed by the instruction speculatively, it does not update the architectural state of the system with the results of an instruction until it is known for certain that the instruction will complete. This may be determined, for example, when the instruction is retired by the ROB 122.

Figure 2:
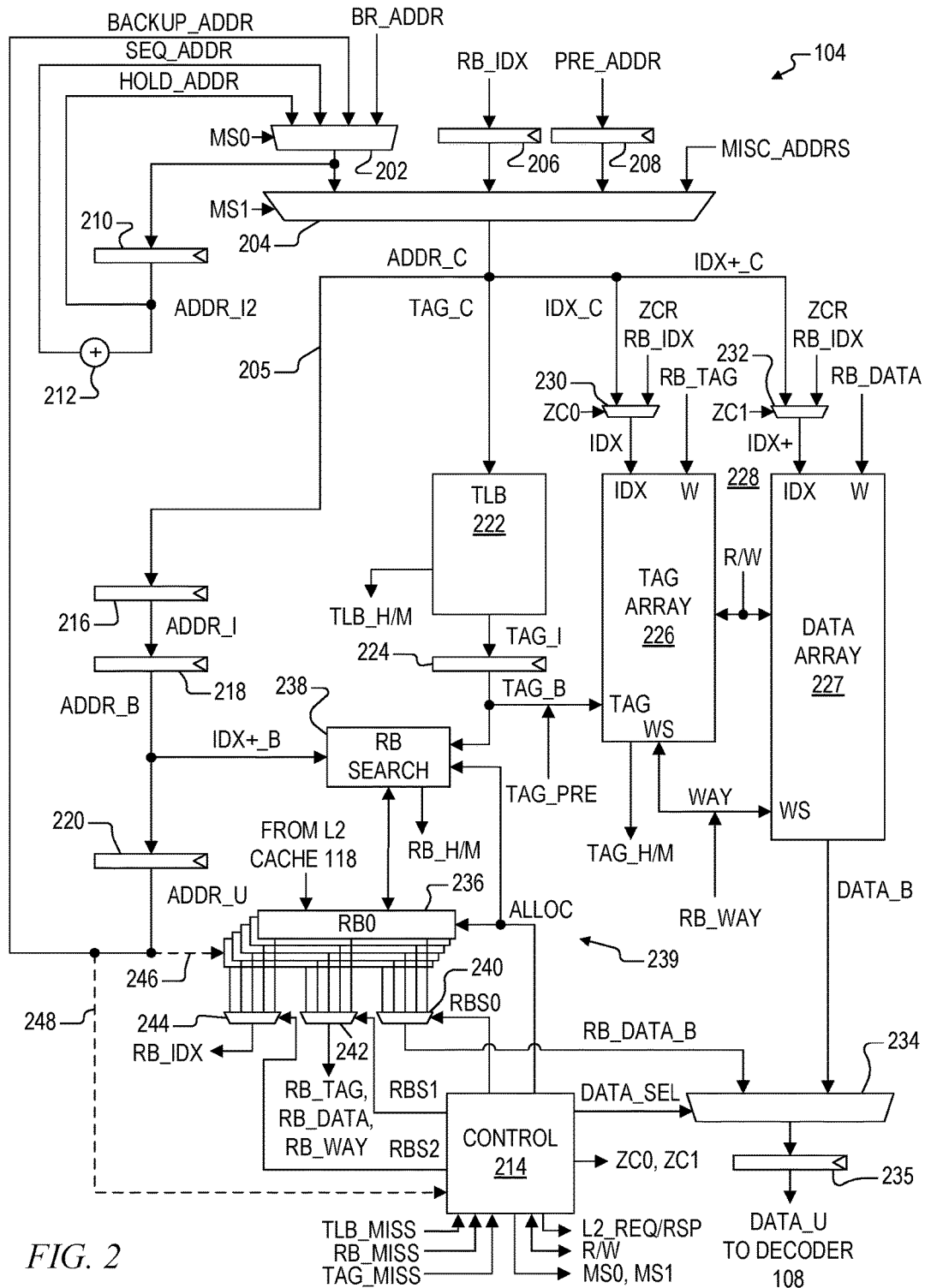
FIG. 2 is a more detailed block diagram of the icache of FIG. 1 implemented according to one embodiment of the present invention.

FIG. 2 is a more detailed block diagram of the icache 104 implemented according to one embodiment of the present invention. The illustrated block diagram is simplified in that many details that are not necessary for a full and complete understanding of the present invention are omitted. The branch address BR_ADDR along with several feedback addresses are provided to respective inputs of a multiplexer (MUX) 202, which provides a selected address to one input of another MUX 204. A first feedback address is a backup address BACKUP_ADDR, a second feedback address is a sequential address SEQ_ADDR, and a third feedback address is a hold address HOLD_ADDR. A response buffer (RB) index (RB_IDX) is provided to another input of the MUX 204 through a register 206, and a prefetch address PRE_ADDR is provided to another input of the MUX 204 through another register 208. Each register shown may be sized according to the data being transferred, is controlled by a processor or core clock signal (not shown), and may be provided for purposes of pipeline timing. One or more miscellaneous addresses, shown as MISC_ADDRS, are provided to one or more inputs of the MUX 204. The miscellaneous addresses may be snoop or invalidate addresses or the like and are not further described.

The output of the MUX 202 is provided through another register 210 providing a registered address ADDR_12, which is fed back as the hold address HOLD_ADDR and is further provided to the input of an adder 212. The output of the adder 212 is fed back as the sequential address SEQ_ADDR. In one embodiment, the adder 212 is configured to advance the address by 16 Bytes (B) as further described herein to sequentially advance addressing by 16B in successive clock cycles. A first select signal MS0 is provided to the select input of the MUX 202 and another select signal MS1 is provided to the select input of the MUX 204, in which the select signals MS0 and MS1 are provided by a control unit 214. Each select signal shown in the diagrams may include one or more bits depending upon the number of inputs of the corresponding MUX, in which the MUX provides a select input to its output based on the select signal.

The MUX 204 provides a selected address ADDR_C on an address bus 205, in which ADDR_C is otherwise referred to as the "fetch" address, for fetching a corresponding cache line from the system memory (based on a selected one of the addresses provided to the MUXes 202 or 204). In one embodiment, the processor 100 uses a memory-mapped configuration in which ADDR_C is a "virtual" (a.k.a., "linear") address (VA) that is not intended to be used to directly access the system memory. Instead, the virtual address is first converted to a physical address (PA) which may then be used to access the cache line from the system memory. The translation is facilitated by a table walk engine or the like (not shown) that retrieves page tables from the system memory, in which the retrieved page table information is used to transform a received virtual address to a corresponding physical address. Once translated, the virtual address and its corresponding physical address are stored together in a translation look-aside buffer (TLB) 222. The TLB 222 is a cache memory that avoids the time-consuming table walk process in the event that the translation is stored therein. A translation remains in the TLB 222 until evicted according to a replacement policy, such as a least-recently used (LRU) policy or the like.

In the illustrated configuration, the icache 104 is implemented in a pipelined configuration in which the suffix notation "_C" appended to the end of the virtual address ADDR_C is a timing notation that denotes a "C" stage of the icache 104. The C stage denotes an arbitration cycle, which is followed by an "I" address access stage, followed by a "B" array access stage, followed by a "U" decision cycle stage as further described herein. The pipeline stages are generally separated by registers clocked by the core clock. As shown, ADDR_C is provided to a register 216 providing a next I stage address ADDR_I, which is provided to a register 218 providing a next B stage address ADDR_B, which is provided to a register 220 providing a next U stage address ADDR_U. ADDR_I and ADDR_I2 are both provided during the I stage. ADDR_U is fed back as the backup address BACKUP_ADDR. Although not specifically shown or described, each address is provided on a corresponding address bus.

The upper portion of the virtual address ADDR_C is a "tag" portion of the address shown as TAG_C, which is provided to an input of the TLB 222. If the virtual address tag and its corresponding physical address tag are not found in the TLB 222, then a TLB "miss" occurs and the TLB 222 asserts a signal TLB hit/miss (TLB_H/M) to the control unit 214 to indicate a miss. Otherwise, if the translation is found, then TLB_H/M is asserted to indicate a "hit" and the TLB 222 outputs the corresponding physical address tag as TAG_I during the I stage. TLB_H/M may be a single binary signal with two states indicating hit or miss or may be implemented as separate hit or miss signals. TAG_I is provided through a register 224 to provide the physical address tag as TAG_B during the B stage. TAG_B is provided to a tag input "TAG" of a tag array 226 of an icache array 228, in which the icache array 228 further includes a corresponding data array 227. Meanwhile, a lower portion of the virtual address ADDR_C is an "index" portion shown as IDX_C, which is provided to one input of a MUX 230 receiving a select signal ZC0 from the control unit 214. The MUX 230 has an output providing a selected index value IDX to an index input of the tag array 226. An extended version of the index, shown as IDX+_C, is provided to one input of another MUX 232 receiving a select signal ZC1 from the control unit 214. The MUX 232 has an output providing a selected index value IDX+ to an index input of the data array 227.

The icache array 228 in the illustrated embodiment is configured as set-associative cache with multiple "ways" for storing multiple cache lines. The index value selects one of multiple sets, in which each set includes a certain number of ways. The tag array 226 searches each way of the set selected by the index for the physical address tag TAG_B. If TAG_B is not found in the tag array 226, it asserts a signal TAG_H/M to the control unit 214 to indicate a miss. In the same manner described above for TLB_H/M, TAG_H/M includes one or more signals indicating a hit or a miss in the tag array 226. When a miss occurs in the tag array 226, the tag array 226 determines the replacement WAY value at that time and also outputs a WAY value from a way select (WS) input/output (I/O) identifying the particular way of the identified set into which the missing cache line is to be placed if and when retrieved from the L2 cache 118 and/or system memory. If TAG_B is found in (e.g., hits) the tag array 226, it asserts a WAY value from its WS I/O to a way select (WS) input of the data array 227 identifying the particular way of the selected set in which the matching physical address tag was found. The data array 227 outputs data from the identified cache line on an output DATA_B provided to one input of an output MUX 234 during stage B. The control unit 214 provides a select signal DATA_SEL to a select input of the MUX 234 for providing selected data to the decoder 108.

The icache array 228 may be configured to read out an entire cache line on DATA_B in a single core clock cycle. In the illustrated configuration, however, each cache line is subdivided into data subchunks which are read out by the data array 227 on DATA_B in successive clock cycles. The extended index IDX+ includes one or more additional least-significant bits (LSBs) to address each subchunk within the selected cache line. The adder 212 increments extended portion of the address in successive clock cycles, and the data array 227 outputs one data subchunk of the selected cache line in each clock cycle.

Figure 3:
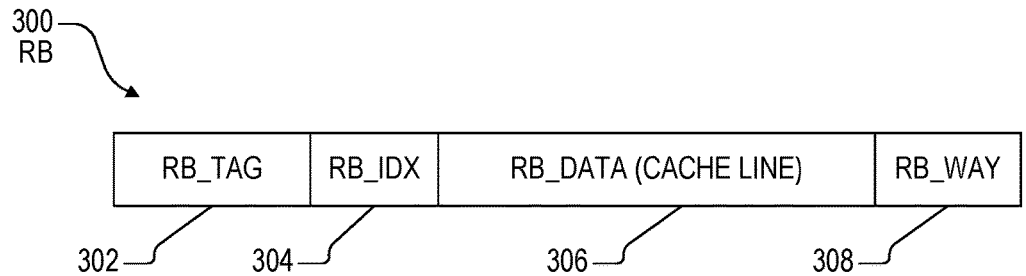
FIG. 3 is a figurative diagram of an exemplary response buffer illustrating the contents of each of the response buffers of the RB array of FIG. 2.

The icache 104 includes an array of response buffers (RB array) 236 and an RB search unit 238. Although the RB array 236 and the RB search unit 238 are shown as separate entities, they are part of a larger response buffer system 239 for handling cache lines retrieved from external memory (e.g., the L2 cache 118 or the system memory). The RB array 236 is provided to temporarily store cache lines retrieved from the L2 cache 118 for ultimate storage in the icache array 228. As described further below, each cache line stored in the RB array 236 is "retired" to the data array 227 to free up the response buffer to receive a new cache line. A first RB is shown as RB0, in which it is understood that "N" response buffers are included numbered 0 to N−1. N may be any suitable number depending upon the particular configuration. In one embodiment, the RB array 236 includes 8 response buffers for temporarily storing up to 8 cache lines. FIG. 3 is a figurative diagram of an exemplary response buffer 300 illustrating the contents of each of the response buffers of the RB array 236. The response buffer 300 includes a tag field 302 for storing a physical address tag RB_TAG, an index field 304 for storing a corresponding physical address index RB_IDX, a data field 306 for storing an entire cache line shown as RB_DATA, and a way field 308 for storing a way value RB_WAY as further described herein.

Referring back to FIG. 2, TAG_B and the index portion IDX+_B of ADDR_B are provided to the RB search unit 238 during stage B, in which the RB search unit 238 searches the RB array 236 for the corresponding cache line. In particular, TAG_B is compared with RB_TAG and the main index portion of IDX+_B (e.g., IDX_B) is compared with RB_IDX of each response buffer holding valid information. The RB search unit 238 asserts a signal RB_H/M to the control unit 214 to indicate whether or not a match is found. In the same manner described above for TLB_H/M, RB_H/M includes one or more signals indicating a hit or a miss in the RB array 236. When a match is found, however, the control unit 214 asserts a select signal RBS0 to a MUX 240 to select the data field 306 of the matching response buffer to access the corresponding cache line stored therein, and RB_DATA from the matching response buffer is output as RB_DATA_B to another input of the MUX 234. The extended index IDX+_B is incremented by the adder 212 in successive cycles to access the individual data subchunks provided to the decoder 108 in a similar manner as described for the data array 227.

The data output from the data array 227, shown as DATA_B, and the data output from the RB array 236, shown as RB_DATA_B, may be provided relatively late during the B stage before the next clock cycle or transition denoting the U stage. A register 235 provided at the output of the MUX 234 registers the selected data as DATA U provided to the decoder 108.

A MUX 242 receives a select signal RBS1 from the control unit 214 for providing the RB_TAG, RB_DATA and RB_WAY of a selected response buffer. Another MUX 244 receives a select signal RBS2 from the control unit 214 for providing the RB_IDX of a selected response buffer. RB_TAG and RB_DATA from MUX 242 are provided to the write inputs "W" of the tag array 226 and the data array 227, respectively, and RB_WAY is provided to the WS inputs of the tag array 226 and the data array 227 during a write cycle. The control unit 214 asserts a read/write (R/W) signal to the tag array 226 and the data array 227 for controlling read and write cycles, respectively. During normal sequential address processing, the control unit 214 asserts R/W to indicate read cycles in which data is read out as DATA_B from the data array 227 or as RB_DATA_B from the RB array 236 in successive clock cycles. The control unit asserts R/W to indicate a write cycle to retire a cache line from a response buffer in the RB array 236 to a location in the data array 227 indicated by corresponding index and way value as further described herein. During each write cycle, a corresponding address tag is stored into a corresponding location in the tag array 226. RB_IDX is provided to the register 206 during a conventional retire write cycle as further described herein. RB_IDX is also provided to the other inputs of both MUXes 230 and 232, in which the control unit 214 selects RB_IDX from the selected response buffer during a zero clock retire (ZCR) write cycle as further described herein.

During a prefetch cycle, the prefetch unit 106 asserts the prefetch address PRE_ADDR through the register 208 and MUX 204 to search the icache array 228 for the indicated cache line. The prefetch unit 106 also asserts a corresponding prefetch address tag TAG_PRE directly to the TAG input of the tag array 226 bypassing the TLB 222 as further described herein. A dashed line 246 from ADDR_U to the RB array 236 represents that when there is a miss in both the icache array 228 and the RB array 236, the miss is determined in the U stage of operation and an available response buffer is allocated and stuffed with a physical address and a WAY value as further described herein. A dashed line 248 from ADDR_U to the control unit 214 represents that stage U is the decision cycle in which decisions are primarily made by the control unit 214 during stage U. The control unit 214 asserts an allocation signal ALLOC provided to the RB array 236 and the RB search unit 238 to allocate a response buffer. The tag portion of ADDR_U (e.g., TAG_U) is a virtual address and not valid for stuffing into the tag field 302 of the newly allocated response buffer. Instead, TAG_B and IDX_B (index portion of IDX+_B) are registered by the RB search unit 238 and used to stuff the index field 304 of the newly allocated response buffer during stage U. The WAY value is provided by the tag array 226 when a miss occurs therein as previously described, in which the WAY value is stuffed into the way field 308 of the newly allocated response buffer.

In a more specific configuration, the physical address (PA) includes a total of 46 bits PA[45:0] and the virtual address (VA) includes a total 48 bits VA[47:0] (or more). In one embodiment, a page size of 4 Kilo-Bytes (KB) is assumed herein so that the tag portion of the address includes the upper, most-significant bits (MSBs) down to bit 12 (e.g., PA[45:12] or VA[47:12]). The TLB 222 stores translations between the tag portion of the virtual address TAG_C and the tag portion of the physical address PA[45:12]. The remaining least-significant bits (LSBs) of the virtual and physical addresses are the same, or PA[11:0]=VA[11:0]. In this specific configuration, the data array 227 is a 32 KB 8-way set-associative cache for storing up to 512 64B cache lines. The tag array 226 and the data array 227 are each divided into 64 different sets selected using a 6-bit index (IDX) comprising the lower [11:6] address bits. The index extension (IDX+) includes the 6 index bits plus an additional 2 LSB address bits, or [11:4], to access each of the 16B data chunks of a cache line when being provided to the decoder 108 via the output MUX 108. It is appreciated, however, that the present invention is not limited to any particular address length, page size, icache array size, cache type, cache line size or number of ways.

In operation, the branch unit 102 communicates to the icache 104 to redirect to the provided branch address BR_ADDR. The branch address may be speculative or non-speculative. A non-speculative branch, for example, may be a direct instruction processed through and determined by the execution units 114. A speculative branch address is determined by one or more prediction processes, which are relatively accurate but not always correct. In the event the speculative address is incorrect, the icache 104 is eventually redirected to the correct location. Once a branch is taken, the icache 104 operates to retrieve and provide sequential cache lines to the decoder 108 during successive read cycles (in which the control unit 214 asserts R/W to indicate read cycles). The branch address may be a virtual address provided as the fetch address ADDR_C. If the address misses the TLB 222, then the corresponding physical address tag has not yet stored within the TLB 222. In one embodiment, the TLB_H/M signal is not actually considered until the U stage, in which case the control unit 214 enters a wait state until the physical address tag is retrieved and the address translation mapping is stored into the TLB 222. The control unit 214 asserts MS0 to select BACKUP_ADDR and then to select HOLD_ADDR so that the address is held as HOLD_ADDR during the wait state.

Meanwhile, the TLB 222 forwards the request to an L2 TLB (not shown) which may store the address translation, in which case the virtual and physical tag address information is provided to the TLB 222. If the L2 TLB also misses, then a table walk operation is performed to retrieve page table information from the system memory, which is used to convert the virtual address tag into the corresponding physical address tag. A hit in the L2 TLB may incur some delay, whereas a table walk operation incurs a significantly greater delay. In either case (hit in L2 TLB or table walk), the control unit 214 enters the wait state until the physical address is retrieved. The TLB hierarchical structure is provided to minimize or otherwise reduce table walk delay in subsequent cycles.

Once the address translation is retrieved and stored into the TLB 222, the pipeline is restarted so that TAG_C hits in the TLB 222, which provides TAG_I and then TAG_B, in which TAG_B is provided to the tag array 226 and to the RB search unit 238. IDX_C is provided to the icache array 228 and IDX_B (part of extended version IDX+_B) is provided to the RB search unit 238. Although not shown, the tag and data arrays 226 and 227 include internal stage registers or the like such that IDX_C provided at the top of the icache array 228 in stage C is internally staged in successive cycles and considered at the same time as TAG_B by the icache array 228 during stage B. In the event of a hit in the icache array 228, then successive subchunks of the identified cache line are read out on DATA_B in successive clock cycles as previously described. If the address misses the icache array 228 but hits in the RB array 236, then the successive subchunks of the cache line stored in the identified response buffer are read out on RB_DATA_B in successive clock cycles as previously described.

When the address misses in both the icache array 228 and the RB array 236, then the control unit 214 asserts ALLOC to allocate an available response buffer of the RB array 236, in which the RB search unit 238 fills the tag field 302 and the index field 304 of the newly allocated response buffer, and the way value from the tag array 226 fills the way field 308. The control unit 214 stalls pipeline addressing using BACKUP_ADDR and HOLD_ADDR as previously described, and further asserts a cache line request to the L2 cache 118 with the requested address, shown as L2 CL_REQ. The address is held as HOLD_ADDR while the icache 104 is in the wait state waiting for the requested cache line.

As described further herein, multiple cache line requests may be made in successive clock cycles and may be returned in a different order than submitted. When a requested cache line is received, it includes corresponding index information which may be used to identify the corresponding response buffer. The control unit 214 places each cache line into the data field 306 of the response buffer that was allocated for that cache line. When the first requested cache line is received, the control unit 214 restarts the pipeline to begin reading out of the RB array 236. Although the virtual address tag has already been found or otherwise stored within the TLB 222, the virtual address is still replayed in the TLB 222 to ensure that it is still valid. The address should still miss in the tag array 226 again, but the address now hits in the RB array 236 since the allocated response buffer contains the requested cache line. The control unit 214 begins reading out the cache line from the allocated response buffer to the decoder 108 as RB_DATA_B via the MUXes 240 and 234.

Each time that a response buffer of the RB array 236 is allocated for a new cache line and a request is sent to the L2 cache 118, the prefetch unit 106 triggers a prefetch operation. During a prefetch operation, the prefetch unit 106 retrieves the physical address tag RB_TAG and index RB_IDX from the allocated response buffer, increments the index by one sequential cache line (e.g., 64B), and submits the sequential address as PRE_ADDR to the icache 104. In general, prefetching does not cross page boundaries, so that only the index is incremented to provide the sequential physical address. Since prefetching is within the same page, searching the TLB 222 may be bypassed. The prefetch unit 106 applies the physical tag as TAG_PRE to the tag array 226 while the corresponding incremented index is provided to both the tag array 226 and the data array 227. In the event of a miss within the icache array 228, the prefetch unit 106 provokes the control unit 214 to submit a new request to the L2 cache 118 with the sequential address. Also, the tag array 226 provides a corresponding WAY value with the TAG_H/M signal. In response, the control unit 214 asserts ALLOC to allocate another response buffer, which is loaded with the corresponding RB_TAG, incremented index RB_IDX and WAY value as previously described, and the control unit 214 submits another request to the L2 cache 118. Once again, upon allocating another response buffer, the prefetch unit 106 initiates another prefetch operation to provoke another cache line request to the next sequential address.

In summary, each time a response buffer is allocated and a corresponding cache line is requested, the prefetch unit 106 initiates another prefetch operation to request the next sequential cache line, causing the icache 104 to allocate another response buffer. Operation may repeat in this manner until up to a predetermined number of cache lines are requested, until the RB array 236 is full, or until a subsequent branch address is retrieved. In this manner, multiple sequential cache line requests are submitted to the L2 cache 118 for storage into the RB array 236. Although the cache lines may not be received in the same order they were requested, once the first requested cache line is retrieved, the control unit 214 restarts the pipeline and the data is read out to the decoder 108.

It is appreciated that the RB array 236 is a limited resource, so that once a cache line is stored into a response buffer, a retire request is triggered to "retire" the cache line by writing it into the icache array 228 during a write cycle. Each cache line stored in the RB array 236 is retired to the icache array 228 even if already read out to the decoder 108, under the presumption that there is a significant probability that the same cache line will be requested again in the future (based on looping operation of most applications). As shown by the exemplary response buffer 300, each response buffer includes sufficient information for storing the cache line to the data array 227. In a conventional configuration, in order to write a cache line into the data array 227 while data is being read out of the RB array 236 (or the data array 227) during inline sequential icache operation, the pipeline is delayed for at least one clock cycle to allow for a write cycle. The address in the pipeline is held by HOLD_ADDR for at least one clock cycle while the control unit 214 switches the icache array 228 into write mode to write the cache line into the correct set and way as identified by the index and WAY value. Once stored, the pipeline is restarted to resume successive read cycle operation.

In the conventional configuration, the index portion IDX_C of ADDR_C does not otherwise match the index portion RB_IDX of the response buffer holding the cache line being retired. The MUXes 230 and 232 were not provided, so that consecutive read cycles of the icache array 228 had to be interrupted for at least one write cycle in order to store the retiring cache line into the icache array 228. In this case, the address had to be held, such as by the HOLD_ADDR, while the control unit 214 asserted RBS2 to select and output the index value RB_IDX of the cache line being retired. In this case, RB_IDX is provided to the register 206. In the next clock cycle, RB_IDX is provided as the index portion of ADDR_C and to the index IDX inputs of the tag array 226 and the data array 227 to select the corresponding set within each array. Also, the control unit 214 asserts RBS1 to select response buffer holding the cache line being retired and to output RB_TAG, RB_DATA, and RB_WAY of the retiring cache line, and the control unit 214 switches R/W to indicate a write cycle. During the write cycle, RB_TAG is provided to the W input of the tag array 226, RB_DATA is provided to the W input of the data array 227, and RB_WAY is provided to the WS input of the data array 227 and also to the way port of the tag array 226. During the write cycle, RB_TAG is written into the selected set and way of the tag array 226 and RB_DATA is written into the selected set and way of the data array 227. The response buffer is then available to hold another retrieved cache line. Once written, the control unit 214 switches R/W back to indicate a read cycle and restarts the pipeline to continue sequential inline operation.

It is appreciated that the conventional retire process inserts a delay or timing bubble into the pipeline processing of icache 104. The address stream is held for at least one cycle to allow the icache array 228 to be available for a write cycle to store the retiring cache line. Although the retire cycle may be performed in a single clock cycle, it is appreciated that the retire cycle had to occur on a regular and frequent basis to free up the response buffers to retrieve additional cache lines from the L2 cache 118 for processing by the processor 100. The timing delays for retiring response buffers, therefore, interrupted the sequential read cycle of the icache 104 on a regular and frequent basis. Such retirement significantly reduced efficiency and performance of the processor 100 over time. The icache 104 is configured, however, to perform zero clock retire write cycles in which cache lines from the RB array 236 may be retired into the icache array 228 without inserting timing delays.

Figure 4:
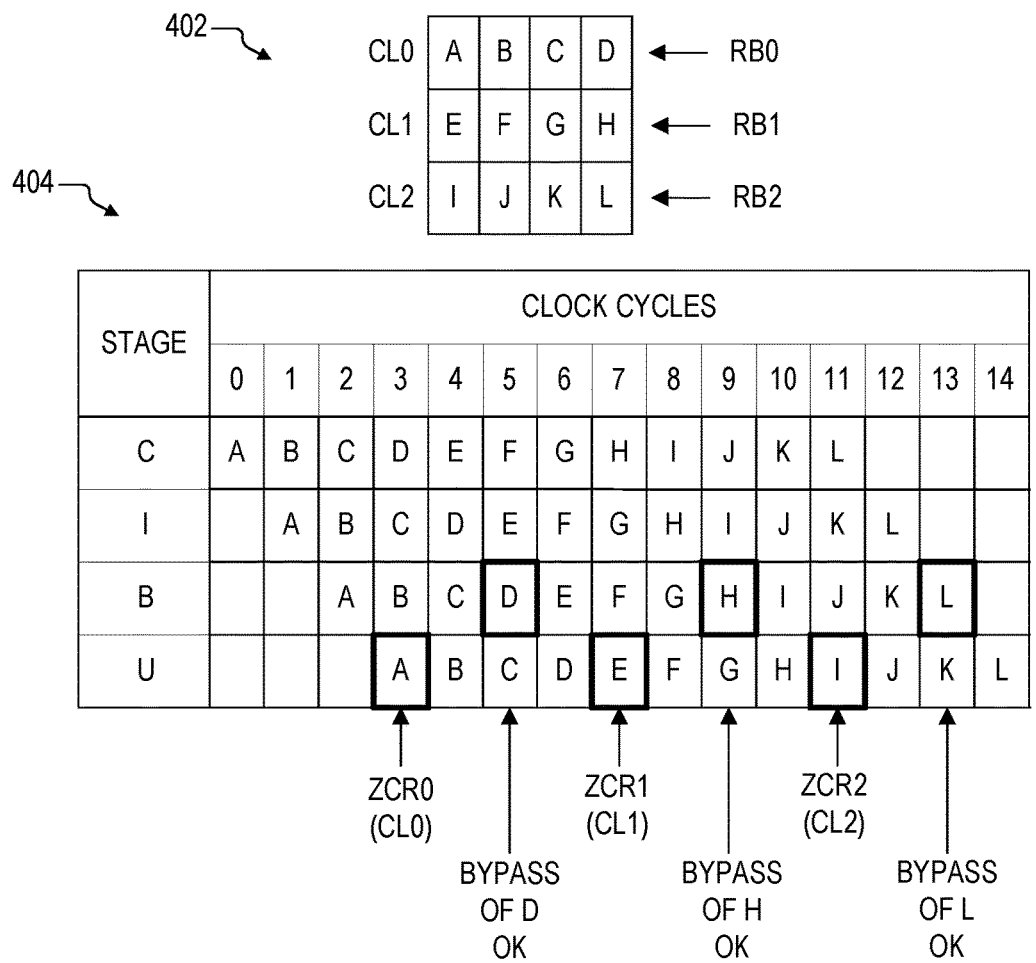
FIG. 4 is a pipeline timing diagram illustrating the process of zero clock retires according to an embodiment of the present invention.

FIG. 4 is a pipeline timing diagram 404 illustrating the process of zero clock retires according to an embodiment of the present invention. A chart 402 illustrates 4 data subchunks of 3 different cache lines CL0, CL1 and CL2 being processed in order by the icache 104. Although each cache line is divided into 4 subchunks, it is understood that each cache line may be divided into any number of subchunks depending upon the particular configuration. The first cache line CL0 includes subchunks A, B, C and D, the second cache line CL1 includes subchunks E, F, G and H, and the third cache line CL0 includes subchunks I, J, K and L. During the prefetch process, the first cache line CL0 is stored in a first response buffer RB0, the second cache line CL1 is stored in a second response buffer RB1, and the third cache line CL2 is stored in a third response buffer RB2. The timing diagram 404 shows the icache stages C, I, B, and U for clock cycles progressing sequentially beginning with clock cycle zero (0) while being sequentially processed through the stages of the icache 104. In the timing diagram 404, the notations of the subchunks positioned in a given stage denotes the corresponding address to that subchunk being processed in that stage. For example, the notation "A" referencing the subchunk A during clock cycle 0 in stage C refers to the address pointing to subchunk A during that clock cycle in stage C.

As shown in the timing diagram, the address to subchunk A of the first cache line CL0 enters the first stage C during the first clock cycle 0. In the next clock cycle 1, the address to subchunk A advances to stage I while the address to subchunk B of subchunk CL0 enters stage C. In the next clock cycle 2, the address to subchunk A advances to stage B, the address to subchunk B enters stage I, and the address to subchunk C enters the first stage C. In the next clock cycle 3, the address to subchunk A advances to that last stage U, the address to subchunk B enters stage B, the address to subchunk C advances to stage I, and the address to the last subchunk D of the same cache line CL0 enters the first stage C. Icache pipeline operation repeats in this manner during subsequent clock cycles 4-14 for the subchunks E-H of the second cache line CL1 and for the subchunks I-L of the third cache line CL2. As shown, for example, the address to subchunk L of the third cache line CL2 sequentially advances through pipeline stages C, I, B and U during successive clock cycles 11-14.

With reference to both FIGS. 2 and 4, the control unit 214 previously submitted a request for cache lines CL0, CL1 and CL2 to the L2 cache 118 so that these cache lines are eventually loaded into the response buffers RB0, RB1 and RB2 of the RB array 236. For example, a branch to cache line CL0 may have been received which missed both the icache array 228 and the RB array 236, causing the control unit 214 to allocate RB0 for CL0 and to submit a request for CL0 to the L2 cache 118. In response, the prefetch unit 106 incremented the address and submitted the address CL1 to query the icache array 228. Assuming a miss, the control unit 214 allocated RB1 for CL1 and submitted a request for CL1 to the L2 cache 118. The process was repeated was so that RB2 was allocated for CL2 and a request was submitted for CL2. It is understood that this process may be repeated for an indefinite number of cache lines.

Once the cache line CL0 is loaded into the response buffer RB0, the control unit 214 restarts the pipeline and the address to the first subchunk A is asserted as ADDR_C in first stage C, shown at clock 0 in the timing diagram 404. The address is incremented by a subchunk amount by the adder 212 in successive clock cycles, so that ADDR_C advances to the addresses of subchunks B, C and D of the first cache line CL0 in the successive clock cycles 1, 2 and 3, respectively. Assuming cache lines CL1 and CL2 have been received by this time, ADDR_C assumes the addresses of subchunks E-H of cache line CL1 and then to addresses of subchunks I-J of cache line CL2 in successive clock cycles 4-11 as shown by the timing diagram 404. During the successive clock cycles, each of the subchunk addresses successively advance from stage C to stages I, B, and U.

In clock cycle 2, the address of subchunk A of cache line CL0 hits in the RB array 236 and the control unit 214 controls MUXes 240 and 234 to read out subchunk A, which is provided to the decoder 108 in the next clock cycle (corresponding with pipeline stage U). In clock cycle 3, the address to subchunk B of cache line CL0 hits in the RB array 236 and the control unit 214 controls MUXes 240 and 234 to read out subchunk B (provided to the decoder 108 in the next clock cycle). In clock cycle 3, since that address to subchunk A hit in the RB array 236 in the previous clock cycle (stage B) and then advanced to stage U, the control unit 214 performs a zero clock retire ZCR0 to write cache line CL0 into the data array 227 during clock cycle 3. This determination is made partly on the fact that the address to subchunk D of the same cache line CL0 is likely at stage C and thus is likely to hit in the RB array 236 in stage B two clock cycles later. As shown by the timing diagram, this is the case since the address to subchunk D is in stage C in clock cycle 3.

In clock cycle 3, the control unit 214 performs the zero clock retire ZCR0 to the icache array 228 by asserting RBS1 and RBS2 to control the MUXes 242 and 244 to select the response buffer RB0 storing the cache line CL0 and output the corresponding data RB_IDX, RB_TAG, RB_DATA and RB_WAY of the cache line CL0. Also, the control unit 214 asserts ZC0 and ZC1 to control the MUXes 230 and 232 to select RB_IDX of the cache line CL0 provided from the response buffer RB0 via the MUX 244. RB_TAG and RB_DATA from the cache line CL0 are provided to the W inputs of the tag array 226 and the data array 227, respectively, and RB_WAY is provided to the way inputs of both of the icache arrays 226 and 227. Furthermore, the control unit 214 switches R/W to the icache array 228 to indicate a write cycle to write cache line CL0 from the RB array 236 to the icache array 228. In this manner, during the clock cycle 3 while subchunk B of the cache line CL0 is read out to the decoder 108, the entire cache line CL0 is simultaneously written into the selected set and way of the icache 228.

It is appreciated that when the control unit 214 controls ZC0 and ZC1 to select the RB_IDX from the RB array 236 rather than IDX_C and IDX+_C from ADDR_C, the current fetch address at stage C is effectively bypassed in clock cycle C. If, as assumed and as shown in the timing diagram 404, IDX+_C is the address to subchunk D of the cache line CL0, then such bypass is inconsequential since this address subsequently hits the RB array 236. This condition is confirmed in clock cycle 5 when the control unit 214 detects the address to subchunk D hitting in the RB array 236 such that RB_H/M from the RB search unit 238 indicates a hit. At this time, the bypassing of address to subchunk D is inconsequential (and thus deemed "OK") and operation may proceed without redemptive action.

As sequential processing continues, the control unit 214 performs another zero clock retire ZCR1 in clock cycle 7 while the address to subchunk E hits stage U. In this case, the control unit 214 asserts RBS1 and RBS2 to select response buffer RB1 holding cache line CL1, asserts ZC0 and ZC1 to select RB_IDX for zero clock retire cycle, and asserts R/W to indicate a write cycle in clock cycle 7. Thus, in clock cycle 7 while subchunk F is being provided to the MUX 234 in stage B, subchunk E is registered and provided to the decoder 108, and the cache line CL1 is written into the icache array 227. However, the address to subchunk H is bypassed in stage C. The zero clock retire ZCR1 is subsequently checked in clock cycle 9 when the address to subchunk H hits the RB array 236, in which case the bypass of H during clock cycle 7 is deemed "OK" and operation may proceed. The control unit 214 performs another zero clock retire ZCR2 to retire cache line CL2 to the icache array 228 in clock cycle 11, in which the address to subchunk L provided as ADDR_C bypassed in clock cycle 11 is deemed "OK" as determined in subsequent clock cycle 13 when it hits in the RB array 236.

Operation may continue in the manner indefinitely as long as cache lines are retrieved from the L2 cache 118 in subsequent sequential read cycles. The cumulative result of avoiding retire delays of sequential cache lines improves efficiency and performance over time. Also, the response buffers are freed up a clock cycle sooner to receive another cache line. As shown by the timing diagram 404, after each zero clock retire when the bypass of ADDR_C address is deemed inconsequential (or not), the response buffer may become available to receive another cache line since the last subchunk has been read out from that response buffer. For example, in clock cycle 5 when subchunk D is read out such that bypass of the address to subchunk D is deemed OK, the response buffer RB0 is freed to receive another cache line.

It is further noted that it is possible that the ADDR_C address changes to another address, so that during the validity cycle the address is not to the last subchunk of the same cache line but still hits the RB array 236. For example, it is possible that in clock cycle 5 that the address is not to subchunk D but instead is to another subchunk of a different cache line stored in the RB array 236. This is inconsequential for zero clock retire cycle, since as long as the address hits the RB array 236 during the validity cycle, the bypass of ADDR_C is still deemed inconsequential.

In some validity cycles, the validity test fails in which the address entering stage B misses the RB array 236. In that case, the retirement of the cache line is still considered valid since any cache line stored in the RB array 236 should be retired to the icache array 228. Nonetheless, if the validity test fails, then the fetch address that was bypassed in the C stage has not been evaluated and may otherwise be missed. In this case, the control unit 214 backs up the address during stage U by selecting BACKUP_ADDR to replay the bypassed address. Also, read processing is essentially stalled in which data is not read out to the decoder 106 until the bypassed address is replayed. The bypassed address is re-presented in stage C and allowed to be compared in the TLB 222 and the icache array 227. The validity test may fail, for example, in the event of a snoop or branch or the like. The consequence of replaying the bypassed address is a cost of several clock cycles, such as up to 4 clock cycles in the illustrated embodiment. It is appreciated, however, that validity test failure occurs substantially less frequently so that the benefit of zero clock retire substantially outweighs the cost of address replay.

In summary, a zero clock retire is performed after each first data subchunk of a cache line has been read out of a response buffer of the RB array 236. When doing so, the fetch address at ADDR_C is bypassed in favor of the RB_IDX provided to the icache array 228 during the zero clock retire cycle. Most of the time, the address being bypassed is to the last data subchunk of the same cache line, or is to other data located in the RB array 236, so that it hits the RB array 226 a few cycles later. Even if it is not the same cache line, as long as it hits the RB array 226 when in stage B, then the address has not actually been bypassed and is correctly processed. If, however, the bypassed address misses the RB array 236 as determined during stage B following a zero clock retire, then the address is simply replayed as decided in stage U. Replay occurs only in the event that the address stream has been interrupted, such as by a snoop or a branch or the like. Essentially, pipeline addressing is split by the MUXes 230 and 232 allowing a different address to access the icache array 228 than the address that is compared with the RB array 236 during the zero clock retire cycle. If, however, the bypassed fetch address does not end up hitting the RB array 236, then the fetch address is fed back to the top of the icache pipeline and replayed. A missed fetch address replay may incur a multiple clock penalty. It is appreciated, however, that the occasional missed fetch address replay penalty is substantially smaller compared to the large number timing delays that are avoided using zero clock retires. In this manner, efficiency is increased and performance of the processor 100 is substantially improved over time.

Figure 5:
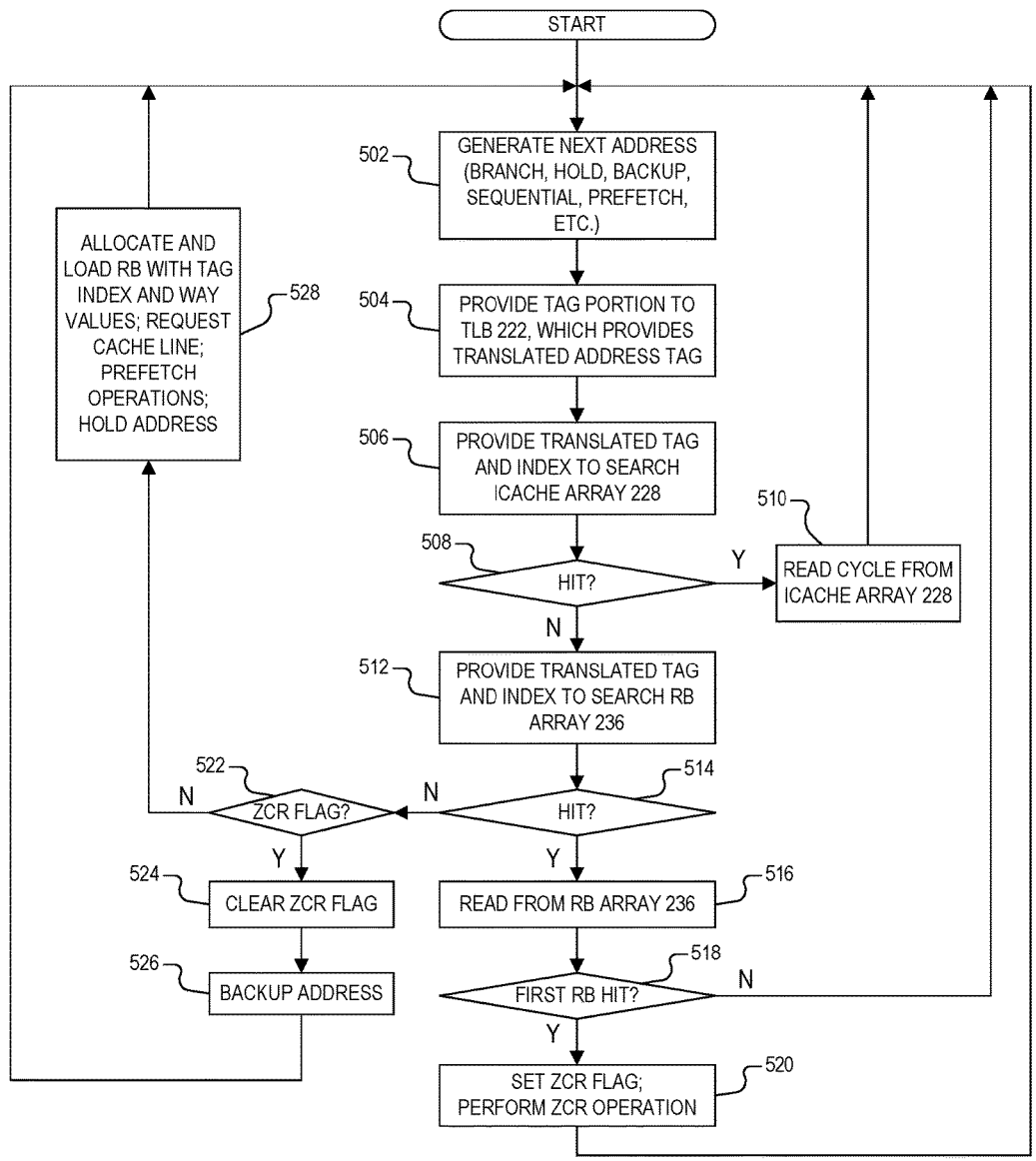
FIG. 5 is a flowchart diagram illustrating operation of the icache of FIG. 1 including performing zero clock retires of cache lines from the RB array to the icache array of FIG. 2.

FIG. 5 is a flowchart diagram illustrating operation of the icache 104 including performing zero clock retires of cache lines from the RB array 236 to the icache array 228. At block 502, the next address ADDR_C is generated on the address bus 205, which is generally the next fetch address. The address may be provided as a branch address, or by the prefetch unit 106 performing a prefetch operation, but may also be a backup, hold, or sequential address as previously described. At next block 504, the tag portion of the address is provided to the TLB 222, which provides a translated address tag, such as TAG_B. Although not shown in FIG. 5, if a miss occurs in the TLB 222, the address is held for multiple cycles until the translation (between virtual and physical addresses) is stored in the TLB 222 and the pipeline is restarted to generate a hit.

At next block 506, the translated tag and index are provided to search the icache array 228. As previously described, the icache array 228 is initially configured to perform read cycles in which R/W indicates read. ZC0 and ZC1 were asserted to select IDX_C and IDX+_C to the index inputs of the tag array 226 and the data array 227 respectively, so that TAG_B and IDX_C are considered at the same time for searching the icache array 228. Generally, the MUXes 202, 204, 230, and 232, the registers 206, 208, 210, 216, 218 and 220 and the adder 212 may be collectively considered as an address generator for generating the fetch address ADDR_C. For purposes of the present disclosure, however, the TLB 222 is also considered as part of the address generator for ultimately providing the physical (e.g., translated) address to the icache 228. At next query block 508, the TAG_H/M signal is evaluated to determine whether the provided address hit in the icache array 228. If so, operation transitions to next block 510 in which a read cycle is performed from the icache array 228 as previously described. A data subchunk is read out as DATA_B provided to the MUX 234. Operation then loops back to block 502, in which the next sequential address is processed in similar manner. Operation may proceed to block 510 and loop back to block 502 for sequential addresses for so long as the requested cache lines are stored in the icache array 228.

When the provided address misses the icache array 228, operation proceeds to block 512 in which the translated tag and index are provided to search the RB array 236. Although the flowchart presents searching the icache array 228 and the RB array 236 sequentially, it is understood that they are searched essentially at the same time during stage B of the icache pipeline. It is also understood, however, that generally the provided address only hits in one of the arrays 228 and 236 at any given time rather than both. As previously described with reference to FIG. 2, TAG_B and IDX+_B are provided to the RB search unit 238 to search each of the response buffers of the RB array 236 holding valid information.

At next query block 514, if the provided address hits the RB array 236, then operation proceeds to block 516 in which the requested cache line is read out from the RB array 236. As shown in FIG. 2, the control unit 214 asserts RBS0 to select the matching response buffer and to read out a data subchunk as RB DATA_B to the MUX 234. At next query block 518, if this is not the first hit of the matching response buffer, then operation returns back to block 502 for processing the next sequential address. At this point, the cache line is already being read out as shown by subchunks B, C and C being read out during clock cycles 4, 5, and 6 as shown in FIG. 4. It is also understood that in a pipeline configuration, the next sequential address has already been generated and is propagating through the icache pipeline, in which the flowchart illustrates conceptual process operation.

If instead the hit is the first to the matching response buffer as determined at block 518, then operation proceeds to block 520 to perform a zero clock retire operation. A ZCR flag is set, and the control unit 214 asserts the appropriate control signals to perform the zero clock retire. As previously described, the control unit 214 asserts R/W to indicate a write cycle by the icache 228. The control unit 214 asserts RBS2 so that the index value RB_IDX from a selected response buffer is provided to the MUXes 230 and 232, and the control unit 214 asserts ZC0 and ZC1 so that RB_IDX is selected by the MUXes 230 and 232 to be provided to the IDX inputs of the tag and data arrays 226, 227 of the icache array 228. The control unit 214 also asserts RBS1 so that the RB TAG, RB_DATA and RB_WAY values of the selected response buffer are provided to the icache array 228 for the write cycle. As shown in FIG. 2, RB_TAG is provided to the write W input of the tag array 226, RB_DATA is provided to the write W input of the data array 227, and RB_WAY is provided to the WS inputs of both arrays 226 and 227. In this manner, the tag and cache line values of the selected response buffer are written into the appropriate way of the appropriate set of the icache array 228 to retire the response buffer. Operation then loops back to block 502 to continue sequential address operation.

It is noted that operation may to either block 518 or to block 520 and then loop back to block 502 in successive cycles for so long as the provided address hits the RB array 236. In this manner, multiple zero clock retire operations may be performed in succession thereby reducing response buffer retirement delays. It is also understood, however, that when the MUXes 230 and 232 are controlled to select RB_IDX rather than IDX_C of ADDR_C, that the fetch address has been effectively bypassed in favor of the zero clock retire. This is inconsequential in successive cycles so long as the bypassed address hits the RB array 236 as determined at block 514.

Referring back to block 514, if the provided address misses the RB array 236, then operation proceeds instead to block 522 in which it is queried whether the ZCR flag has previously been set. If so, then the bypassed address has not hit the RB array 236 and thus should be replayed. Operation proceeds to block 524 in which the ZCR flag is cleared, and then to block 526 to backup the bypassed address to be replayed in the icache pipeline. As shown in FIG. 2, the bypassed address is provided as ADDR_U, which is then selected by the MUXes 202 and 204 to be fed back to ADDR_C in the next clock cycle. Operation then returns back to block 502, in which the bypassed address is fed as the next fetch address provided to the TLB 222 and the icache array 228. In this manner, the bypassed address is not missed but instead is replayed with a small time penalty. The time penalty is up to 4 clock cycles since successive addresses processing through the icache pipeline are ignored in order to replay the bypassed address.

Referring back to block 522, if the ZCR flag is not set, then the address simply missed both the icache array 228 and the RB array 236, in which case operation proceeds to block 528 to request the cache line from external memory. As previously described, a response buffer is allocated and loaded with the tag, index, and way values, the control unit 214 requests the cache line from external memory, including the L2 cache 118, and the prefetch unit 106 may initiate prefetch operations. Furthermore, the current address is backed up and held until the requested cache line is retrieved. Operation returns to block 502, in which operation is suspended until the requested cache line is retrieved, and then sequential address operation is restarted.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like. Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A method of operating a processor, comprising:
performing successive read cycles from an instruction cache array and a line buffer array including providing a plurality of sequential memory addresses, wherein the instruction cache stores cache lines retrieved from an external memory, and wherein the line buffer array buffers the cache lines for the instruction cache array;
during said performing successive read cycles, detecting a read hit in the line buffer array; and
in response to said detecting a read hit in the line buffer array during said performing successive read cycles, performing a zero clock retire, comprising:
switching the instruction cache array from a read cycle to a write cycle for one cycle;
selecting a line buffer of the line buffer array and providing a cache line stored in the selected line buffer to be stored into the instruction cache array at an address stored in the selected line buffer; and
bypassing a sequential memory address being provided to the instruction cache array during the zero clock retire.

2. The method of claim 1, wherein said performing a zero clock retire further comprises:
selecting an address index from the selected line buffer to be provided to an index input of the instruction cache array;
selecting a way value from the selected line buffer to be provided to a way input of the instruction cache array; and
selecting a tag address and a cache line from the selected line buffer to be provided to respective inputs of the instruction cache array.

3. The method of claim 2, wherein said selecting a line buffer of the line buffer array comprises selecting a line buffer that is being read during the zero clock retire.

4. The method of claim 2, wherein said selecting a line buffer of the line buffer array comprises selecting a line buffer that is not being read during the zero clock retire.

5. The method of claim 2, wherein said selecting an address index from the selected line buffer to be provided to an index input of the instruction cache array comprises controlling select logic that selects between an address index of a selected line buffer and an address index of the plurality of sequential addresses.

6. The method of claim 1, further comprising:
detecting the bypassed sequential memory address hitting the line buffer array during a subsequent cycle; and
continuing said performing successive read cycles.

7. The method of claim 1, wherein:
said performing successive read cycles comprises performing successive read cycles to data subchunks of sequential cache lines;
wherein said detecting a read hit comprises detecting an address to a first data subchunk of a first cache line hitting the line buffer array;
wherein said performing a zero clock retire comprises performing the zero clock retire during the next cycle after said detecting a read hit;
wherein said bypassing a sequential memory address comprises bypassing an address to a last data subchunk of the first cache line.

8. The method of claim 7, further comprising:
subsequently detecting the address to the last data subchunk of the first cache line hitting the line buffer array;
reading the last data subchunk from the line buffer array;
during said reading the last data subchunk, detecting an address to a first data subchunk of a second and sequential cache line hitting the line buffer array; and
in a next cycle after said detecting an address to a first data subchunk of a second and sequential cache line hitting the line buffer array, performing another zero clock retire.

9. The method of claim 8, wherein said performing a zero clock retire comprises selecting a line buffer storing the first cache line, and wherein said performing another zero clock retire comprises selecting a line buffer storing the second and sequential cache line.

10. The method of claim 1, further comprising:
detecting the bypassed sequential memory address missing the line buffer array during a subsequent cycle;
terminating said performing successive read cycles; and
providing the bypassed sequential memory address again during a subsequent read cycle from the instruction cache array and the line buffer array.

11. A processor, comprising:
a branch unit that provides a branch address;
an address generator that receives said branch address and that provides a plurality of sequential addresses;
a line buffer system receiving said plurality of sequential addresses, comprising:
a plurality of line buffers; and
a search unit that searches said plurality of line buffers for at least one of said plurality of sequential addresses and that provides a hit indication indicative of whether a match is found;
an instruction cache array;
select logic coupled to said line buffer system and to said instruction cache array; and
a control unit that performs a zero clock retire in response to said hit indication indicating a hit within said line buffer system, wherein said control unit:

controls said instruction cache array to switch to a write cycle;

controls said select logic to provide an address and a cache line from a selected line buffer to write said cache line into said instruction cache array at a location based on said address; and controls said select logic to bypass one of said plurality of sequential addresses.

12. The processor of claim 11, wherein said address from said selected line buffer comprises a tag provided to a tag input of said instruction cache array and comprises an index provided to said select logic for selecting from among a plurality of sets within said instruction cache array for storing said cache line.

13. The processor of claim 12, wherein said selected line buffer further stores a way value that is provided to a way input of said instruction cache array for selecting from among a plurality of ways of a selected set.

14. The processor of claim 11, wherein said control unit controls said select logic to select said selected line buffer as a line buffer that stores a matching address that caused said hit indication to indicate said match.

15. The processor of claim 11, wherein said control unit controls said select logic to select said selected line buffer as a different line buffer than a line buffer that stores a matching address that caused said hit indication to indicate said match.

16. The processor of claim 11, wherein after performing said zero clock retire, when said search unit subsequently provides said hit indication indicating that a matching one of said plurality of line buffers stores an address that matches said one of said plurality of sequential addresses that was bypassed, said control unit initiates a read cycle from said matching one of said plurality of line buffers.

17. The processor of claim 11, wherein said control unit performs said zero clock retire each time that said hit indication is a first hit of one of said plurality of line buffers.

18. The processor of claim 11, wherein:

said address generator comprises an address feedback configured to replay addresses; and wherein after performing said zero clock retire, when said search unit subsequently provides said hit indication indicating that said one of said plurality of sequential addresses that was bypassed subsequently misses said plurality of line buffers, said control unit controls said address generator to replay said one of said plurality of sequential addresses that was bypassed.

19. The processor of claim 11, wherein said address generator comprises an adder that increments each subsequent address by less than a full cache line to address each of a plurality of data subchunks within each cache line.

20. The processor of claim 11, further comprising a prefetch unit that prefetches a cache line at an address that misses both the instruction cache and the line buffer system.

* * * * *